United States Patent [19]

Daggett et al.

[11] Patent Number: 4,870,430

[45] Date of Patent: Sep. 26, 1989

[54] SOLID INK DELIVERY SYSTEM

[75] Inventors: Robert C. Daggett, Chelmsford, Mass.; Richard R. Helinski, Hudson, N.H.; Robert Howard, New York, N.Y.; Mark W. Magee, Derry, N.H.

[73] Assignee: Howtek, Inc., Hudson, N.H.

[21] Appl. No.: 116,226

[22] Filed: Nov. 2, 1987

[51] Int. Cl.[4] ...................... G01D 15/16; B65G 59/00

[52] U.S. Cl. ................................ 346/140 R; 221/298; 221/299; 221/301

[58] Field of Search ................ 346/140; 221/298, 299, 221/301

[56] References Cited

U.S. PATENT DOCUMENTS

| | | | |
|---|---|---|---|
| 4,423,848 | 1/1984 | Tanaka | 221/298 |
| 4,636,803 | 1/1987 | Mikalsen | 346/140 PD |

*Primary Examiner*—E. A. Goldberg
*Assistant Examiner*—Mark Reinhart
*Attorney, Agent, or Firm*—Nutter, McClennen & Fish

[57] ABSTRACT

A solid ink delivery system for supplying sticks of solid ink to a ink jet printer is disclosed. The solid ink delivery system includes a delivery assembly for each color ink stick supplied to the printer. Each delivery assembly includes a tube assembly where the ink sticks are stacked prior to their delivery to the printer. A triggerable ink stick feed assembly is provided for normally holding the in sticks in place. When triggered, the ink stick feed assembly releases the bottommost ink stick or sticks to an opening in the printer adapted to receive them, and restricts the movement of the above stacked ink sticks. The solid ink delivery system is adapted for use with a moving print head having a number of reservoir openings each adapted to receive ink sticks of a different color. A positioning means aligns the print head so the reservoir openings are under the tube assemblies that supply them with the appropriate color ink. Registration assemblies inhibit the triggering of the ink stick feed assemblies unless a reservoir opening for the color ink stick they supply is properly aligned.

11 Claims, 3 Drawing Sheets

SOLID INK DELIVERY SYSTEM

FIELD OF THE INVENTION

This invention relates to an ink delivery system for an ink jet printer and in particular to an ink delivery system that selectively delivers solid sticks of ink to a "hot-melt" type ink jet printer.

BACKGROUND OF THE INVENTION

Ink jet printers are becoming an increasing popular type of device for recording permanent images on paper. Ink jet printers operate by directing a stream of minute ink droplets at the paper so as to produce a distinct pattern of individual ink dots. By selectively forming ink dots on paper, and by regulating the number of dots formed on the paper, an ink jet printer can be used to create almost any type of print: text; graphics; or images. This capability had made it attractive to attach ink jet printers to computer systems that produce both textual material and images simultaneously. This is because a properly programmed ink jet printer can be used to produce a complicated image and a detailed description of the image on the same page.

Moreover, many ink jet printers are capable of discharging multiple colors of ink so as to generate quality color figures and images. This capability has contributed to their popularity since computer systems that can generate multi-color video output in the form of graphics and images are becoming increasingly common. These computer systems require printing devices that can produce permanent images of the output they generate. The ability of ink jet printers to produce text and images in color has also made them useful for desk top publishing which allows a small user to efficiently, economically and rapidly produce publications that contain textual material that is accompanied by color images.

A popular type of ink jet printer is one that relies on solid ink that is melted immediately prior to jetting. These printers are often referred to as "hot-melt" ink jet printers and are said to rely on "phase-change" inks. Hot melt ink jet printers are used, in part, because the ink they discharge solidifies rapidly on contact with the paper and forms ink dots with very sharp optical edges so the resulting images are of very high quality. Phase change inks also have exceptional true color mixing properties which is an important characteristic for color printers that typically have three base color inks, plus black ink, that are blended together to print a very large spectrum of intermediate colors.

A typical hot melt ink jet printer has an ink jet reservoir, in communication with a set of one or more ink jets, for each color of ink jetted therefrom. The ink jet reservoirs have heating elements and are adapted to receive ink in either a solid or liquid state and melt and/or maintain the ink in the liquid state prior to jetting. The ink jets are in communication with the reservoirs and are designed to jet onto the paper liquid state ink jetted therefrom. If the printer is a multi-color printer it uses a number of reservoirs, at least one for each color of ink jetted therefrom. Separate ink jets are connected to each of the reservoirs to jet the ink therein.

An important consideration in the design of hot-melt ink jet printers is providing a means to supply solid ink for melting and subsequent jetting. One concern in the design of a solid ink delivery system is the need to limit the amount of solid ink delivered for melting at any one time. If too much ink is delivered for melting, liquefied ink may flow out of the reservoir and onto the printer, possibly damaging the ink supply delivery system, or another element of the printer.

Moreover, if there is excessive ink in the reservoir it may inhibit the shutting down and starting up of the ink jet printer such as at the end and beginning of successive days of operation. For instance, if there is a large amount of ink in the reservoir at the end of the day, it will all resolidify when the printer is turned off at the end of the day and the heating elements are deactivated. At the start of the next day, the printer is turned on, it may take a considerable amount of time to reliquefy all the ink in the reservoir so the printer is ready for printing. This would delay the start of the printing when the printer is first turned on.

Furthermore, the repeated melting, resolidification, and subsequent reliquefaction of some inks may change their chemical properties in a way that would adversely affect how they are jetted by the printer or appear on the paper after jetting.

Another reason excessive amounts of solid ink should not be supplied for melting is that it is undesirable to maintain phase change ink in the liquid state for an excessive amount of time prior to jetting. This is because the heat supplied to maintain the ink in the liquid state may also "cook" desirable volatile components out of the ink. The volatile components may be ones that inhibit the ink from developing solid deposits, or clotting, as it is supplied through the jets. The volatile components may also contribute the ink's desirable optical qualities when it is jetted onto the paper.

Another consideration is providing enough solid ink for liquefaction and jetting. If insufficient amounts of liquid ink are in a reservoir, the ink jets connected thereto may not be able to maintain a sufficient head of ink to continually jet ink when they are activated. If the ink jets are unable to jet ink regularly, the subsequent images produced by the printer would be significantly degraded.

Still another factor in supplying solid ink, or any ink, to an ink jet printer involves color printers and the need to insure that the right color ink is supplied to each reservoir and associated jets. If the wrong color ink is supplied to a reservoir and subsequently jetted, the image produced will be wholly undesirable. Moreover, the cost and time required to clean the reservoir and jets so the proper color ink can be loaded therein would be quite high.

Printer mechanical error can cause the wrong color ink to be supplied to a hot melt ink jet printer. Mechanical error is possible because the printing system of most hot melt ink jet printers are designed to move across the paper being printed on so substantially all of it may be printed on. Consequently, there is always the possibility the ink reservoirs and the ink supply system will be out of registration, and the wrong color ink will be supplied to a reservoir.

Furthermore, the ink supply means should be designed so as to minimize the number and unpleasantness of the tasks the operator tending to the printer has to perform. Thus the ink should be packaged in a form that is not undesirable for the operator to handle. Moreover, the operator should be able to supply the printer with a large amount of ink so he/she does not use excessive amounts of time refilling it with same.

There have been some attempts at providing solid ink supply systems wherein the solid ink is contained as a cartridge that is coupled to the reservoir. The ink cartridge is heated an ink dripped into the reservoir below. A disadvantage of this system is that either excessive ink or not enough ink may be supplied to the reservoir. Also, the ink cartridges contain only a limited amount of ink. If the ink jet printer the ink cartridges are part of is used a lot, the operator may have to spend an excessive amount of time replacing empty cartridges. Moreover providing ink in cartridges tends to be relatively expensive.

SUMMARY OF THE INVENTION

Accordingly, it is an object of this invention to provide a novel solid ink supply mechanism that can selectively supply a desired amount of solid ink to a hot melt ink jet printer for melting and subsequent printing.

It is another object of this invention to provide a solid ink supply system that supplies the correct color of solid ink to the appropriate reservoirs of a color ink jet printer in a way that is substantially free form either mechanical error or human error.

It is a further object of this invention to provide a solid ink supply system for an ink jet printer that employs solid ink that is not unpleasant for the operator tending the printer to work with.

It is still another object of this invention to provide a solid ink supply system for an ink jet printer that can be provided with large amounts of solid ink.

It is still a further object of this invention to provide a solid ink supply system for an ink jet printer that can be used with a form of solid ink that is economical to manufacture.

In accordance with the preferred embodiment of this invention, a novel solid ink delivery system is provided that selectively supplies individual sticks of solid ink to an ink jet printer print head that includes a one or more reservoirs each with associated ink jets. The solid ink delivery system includes a separate delivery assembly for each color of ink stick delivered to the hot melt ink jet printer.

Each delivery assembly includes a tube assembly wherein the ink sticks are stacked prior to delivery to the appropriate reservoir. Separate ink stick feed assemblies control the release of ink sticks from each of the tube assemblies. Whenever an ink stick feed assembly is triggered, the bottommost ink stick in the associated tube assembly is released into the reservoir opening aligned therebelow. After an ink stick has been supplied to the appropriate reservoir, the ink stick feed assembly allows the ink sticks remaining in the tube assembly to advance towards the print head, so when needed, the next ink stick is in the bottommost position and can thus delivered to the appropriate reservoir.

The solid ink delivery system has a positioning assembly for aligning the print head so the reservoir openings are aligned under the appropriate delivery assembly. Each delivery assembly has a registration assembly that prevents the ink stick feed assembly from successfully being triggered unless a reservoir opening for a reservoir holding the color ink stick supplied by the deliver assembly is aligned under its tube assembly.

This delivery system supplies, on demand, a selected amount of ink, of the right color, to an ink jet reservoir for melting and subsequent jetting. Since only one stick of ink is supplied at a time, the amount of ink delivered to the print head, one ink stick worth, is precisely controlled. This eliminates the possibility that either too much ink or too little ink could be delivered to the print head, and that printing could consequently be affected by the problems caused thereby.

This ink delivery system relies on sticks of ink that are not unpleasant for an operator to handle. Moreover the ink sticks can be readily manufactured at relatively minimal cost. Also, the tube assemblies contain a large number of sticks so the operator does not have to spend a large amount of time repeatedly resupplying this delivery system with ink.

Moreover, this ink delivery system is designed so it is substantially impossible for mechanical error to cause ink sticks of the wrong color to be delivered to a reservoir for melting and jetting. In order for the ink stick feed assembly to supply ink to a reservoir, the associated registration assembly must allow it to successfully trigger. If the correct reservoir opening is not in registration with a particular delivery assembly (i.e. the wrong reservoir opening is), the registration assembly blocks the ink stick feed from successfully triggering and the subsequent release of an ink stick thereby.

FIG. *2a* is side perspective view of an ink stick used in conjunction with the solid ink delivery system of this invention.

Figure 3:
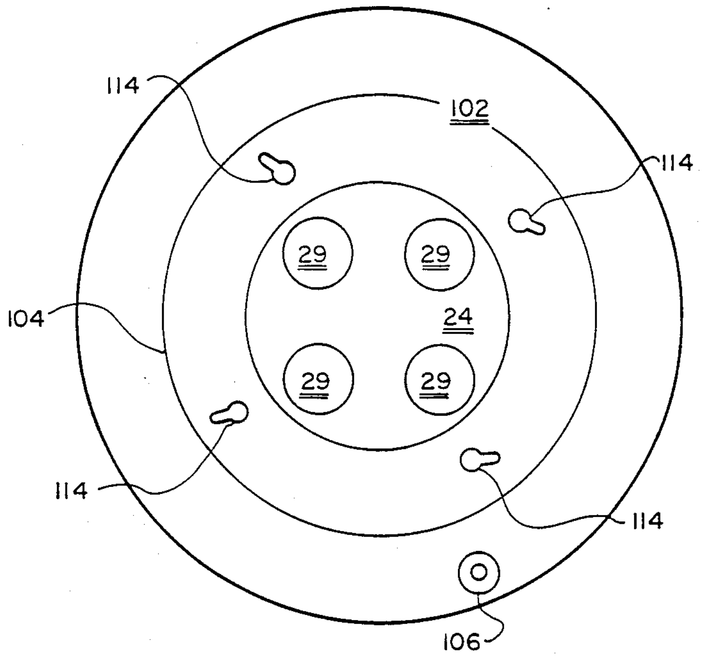

FIG. 3 is a top plan view of the rotary print head of the ink jet printer illustrating the reservoir openings, the registration pin openings, and the capture notch.

DETAILED DESCRIPTION OF THE INVENTION

Figure 1:
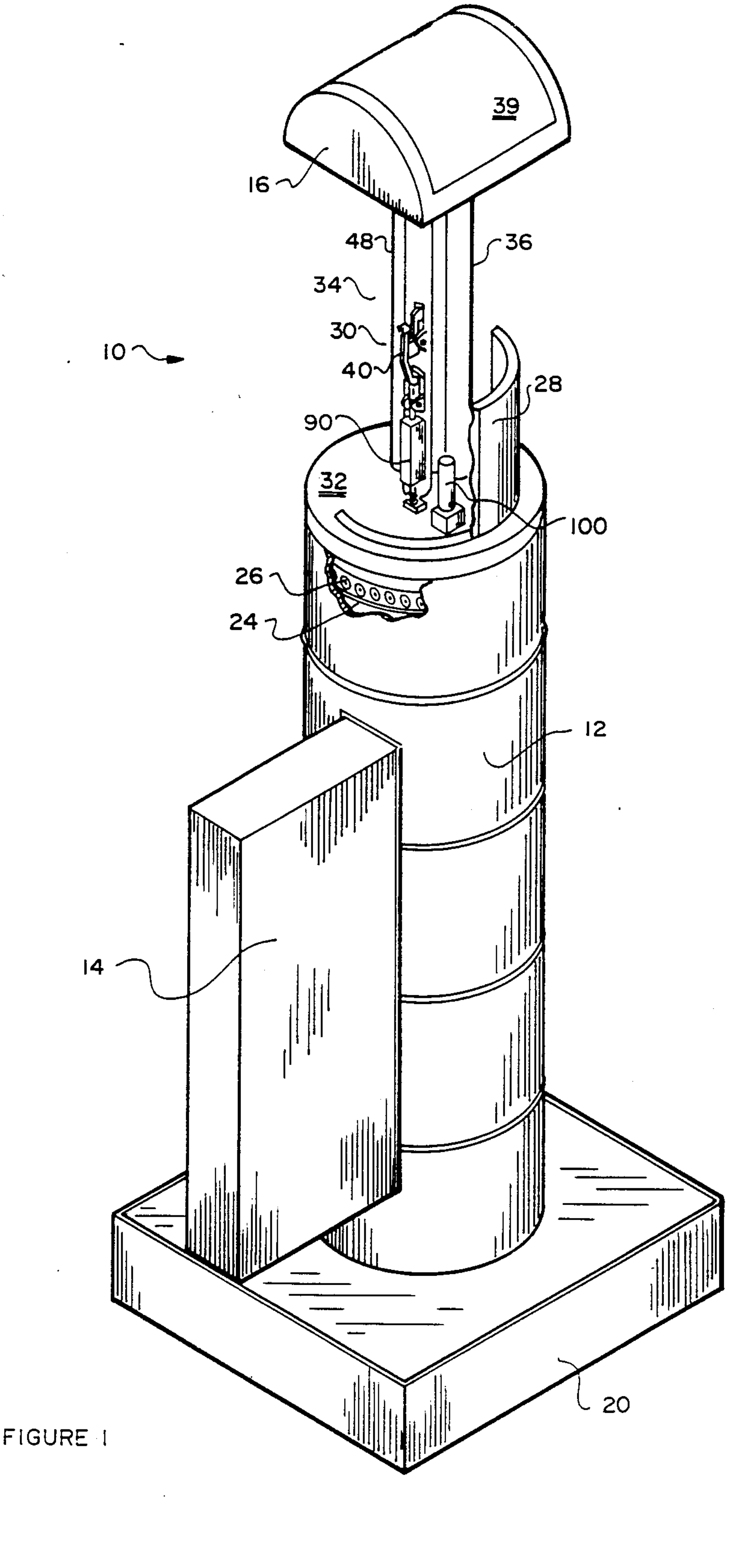
FIG. 1 is a side perspective view of a rotary print head ink jet printer that employs the solid ink delivery system of this invention.
Figure 2A:
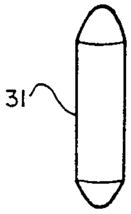
FIG. 2 is a partially cut away view of the ink jet printer of FIG. 1 illustrating one of the delivery assemblies of the solid ink delivery system of this invention.
Figure 2:
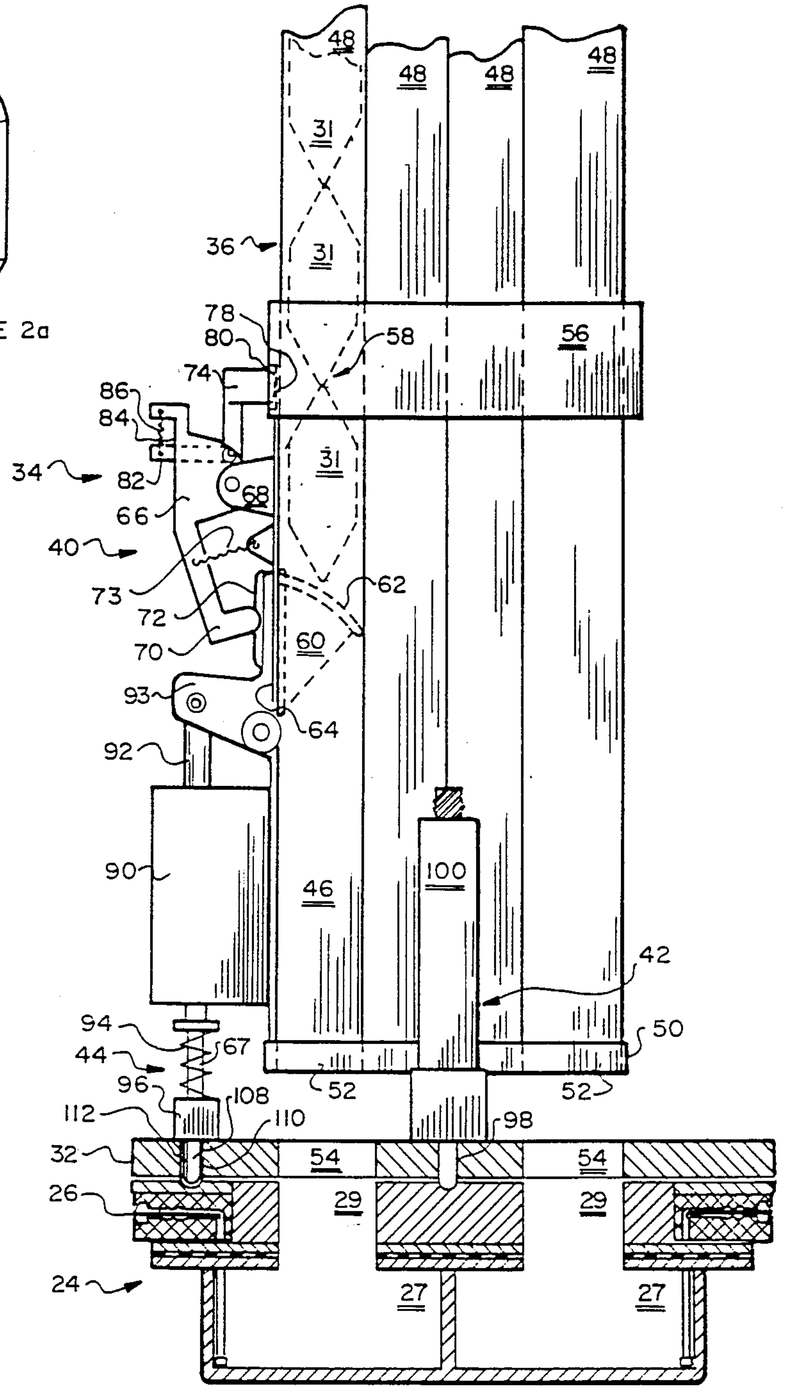

FIG. 1 depicts an ink jet printer 10 of the type that employs solid or phase change ink. The printer 10 includes an image insert assembly 12, a paper cartridge 14 and a power stacker 16. The entire printer assembly rests on a base 20. Encased in the base 20 is a printer control circuit (not illustrated) that contains the logic circuitry necessary to operate the printer 10. As best seen by reference to FIG. 2, housed within the image insert assembly 12 is a cylindrical print head 24, adapted for rotation, that includes a number of ink jets 26. A sheet of paper 28 is fed up through the image insert assembly 12 adjacent the print head 24. The paper 28 subtends an arc approximately two thirds around the circumference of the print head 24.

When the printing system 10 is operating, paper 28 is supplied to the image insert assembly 12 from the paper cartridge 14, the paper 28 moves upward through the image insert assembly 12, the print head 24 rotates, and ink droplets from the jets 26 are selectively discharged onto the paper to form ink dots (not illustrated), the paper 28 is then received by the power stacker 16 and transferred thereby to an output tray (not illustrated). The final image produced on the paper is the cumulative form of the individual ink dots that have been formed on it.

The print head 24 is provided with solid ink that is subsequently discharged from the ink jets 26. As will be described in detail hereinafter, sticks of solid ink are selectively supplied to one or more reservoirs 27, best seen by reference to FIG. 2, within the print head 24. Each reservoir supplies ink to a separate set of ink jets 26. The ink sticks are introduced into the reservoirs through separate reservoir openings 29 formed in the top of the print head 24. Heating elements (not illustrated) in the print head 24 liquefy the solid ink in the reservoirs 27 so a liquefied fraction of ink can be supplied to the individual jets for discharge therefrom. Level sensors, or other detect means (not illustrated), are used to monitor the amount of ink in each of the reservoirs 27. The state of the level sensors is in turn monitored by the printer control circuit.

The illustrated printer 10 is a color printer that jets a different color from each set of ink jets 26. Thus, the print head 24 forms multiple reservoirs 27 each of which supplies a distinct color of ink to a separate set of ink jets 26 associated therewith. Accordingly, different color ink sticks 31 are supplied to the individual reservoirs 27. Typically, a color ink jet printer jets four colors of ink; the three base colors plus black. In the illustrated embodiment, the print head 24 has four reservoirs 27, one for each of the afforemented ink colors.

An ink stick delivery system 30 supplies ink sticks 31 of the appropriate color to the print head reservoirs 37 located therebelow. The ink stick delivery system 30, which is attached to an off wheel supply cover 32 above the print head 24, has a separate delivery assembly 34 for each color of ink stick 31 supplied to the print head 24. Each delivery assembly 34 includes a tube assembly 36 wherein the elongated solid ink sticks 31 are held end-to-end (ink sticks 31 shown in phantom) prior to their delivery to the appropriate reservoir 27. An ink stick feed assembly 40 is attached to each of the tube assemblies 34 above the off wheel ink supply cover 32. The ink stick feed assemblies 40 control the passage of ink sticks 31 through the tube assembly 36, so that when each feed mechanism is triggered, a selected number of ink sticks 31 are released to the reservoir 27 aligned therebelow. In the illustrated embodiment, the ink sticks 31 and ink stick feed assembly 40 are dimensioned so that each time an ink stick feed assembly 40 is triggered, a single ink stick 31 is released to the reservoir 27 aligned below.

The solid ink delivery system 30 includes a positioning system 42 for aligning the print head 24 so that the appropriate reservoir openings 29 are aligned under the tube assemblies 36 from which the correct color of ink stick 31 is supplied thereto. Each delivery assembly 34 has a registration assembly 44 that prevents the associated ink stick feed assembly 40 from successfully triggering unless a reservoir opening 29 for receiving the color of ink supplied by the delivery assembly is aligned underneath.

Each tube assembly 36 comprises a lower tube 46 and an upper tube 48 coupled axially thereto. The lower tubes 46 are mounted on a single pedestal 50 spaced above the off wheel ink supply cover 32. Individual bores 52 are formed in the pedestal 50, and individual bores 54 are formed in the off wheel supply cover 32 so that the ink sticks 31 can pass from therethrough into the appropriate reservoir opening 29. The upper tubes 48 are attached at the top ends to the base of the power stacker 16. the lowre tubes 46 and upper tubes 48 are attached together by a single coupling piece 56 formed with bores 58 so that the ink sticks 31 can freely pass therethrough.

The upper tubes 48 are attached to the power stacker 16. A cover 39 formed in the power stacker 16 allows the open ends of the upper tubes 48 to be accessed so ink sticks 31 can be inserted therein.

Each ink stick feed assembly 40 includes an ink stick holder 60 pivotally attached to the side of the lower tube 46. The ink stick holder 60 includes a curved platform 62 that normally extends into the interior of the lower tube 46 through a rectangular slot 64 formed therein. The ink stick holder platform 62 is dimensioned so that when positioned within the lower tube 48 the movement of ink sticks 31 therethrough is blocked. An intermediate lever 66, generally in parallel alignment with the tube assembly 36, is pivotally attached to a pair of laterally projecting posts 68 formed in the lower tube 46 above the rectangular slot 64. The lower end of the lever 66 includes two spaced apart fingers 70 that abut against the outer surface of the ink stick holder 60 and that ride along the sides of a vertically oriented external rib 72 formed on the outside of the ink stick holder 60. A biasing spring 73 connected between the lever 66 and the lower tube 46 below the pivot mount posts 68 urges the lever fingers 70 against the ink stick holder 60.

An ink stick stopper 74 is pivotally attached to the upper portion of the lever 66. The ink stick stopper 74 has a perpendicularly extending tab 78 that partially extends into a slot 80 formed in the coupling piece 56. The ink stick stopper tab 78 has a rounded surface and is dimensioned so that when it is urged into the coupling piece bore 58, any ink stick 31 therein will be seized between it and the bore wall and prevented from moving. A lateral arm 82 extends from the pivot point of the ink stick stopper beyond the body of the lever through opening 84 formed therein. The opening 84 is dimensioned to allow the arm 82 to rotate so that the ink stick stopper 74 can pivot. A bias spring 86 is connected between the top of the lever 66 and the ink stick stopper arm 82 biases the ink stick stopper so that it is in approximately parallel alignment with the lever 66.

A feed assembly solenoid 90 is used to trigger the ink stick feed assembly 40. The solenoid 90 is of the push-pull variety and is mounted to the lower tube 46 between the off wheel ink supply cover 32 and the ink stick feed assembly 40. The individual solenoids 90 are controlled separately by the printer control circuit. Each solenoid 90 is connected to the associated ink stick feed assembly 40 by a solenoid rod 92 attached to a pair of mounting tabs 93 formed in the ink stick holder 60 near its pivot point. A biasing spring 94 is located around the base of the solenoid, between the off wheel ink supply cover 32 and a coupling member 96 attached to an extension of the solenoid rod 67.

The ink stick feed assembly 40 and solenoid 90 are arranged so that when the solenoid 90 is in its normal, deenergized state, ink stick holder platform 62 extends into the lower tube 48, and the ink stick stopper tab 78 only extends into the space defined by the coupling piece slot 80. When the solenoid 90 is energized, the solenoid rod 92 is retracted into the solenoid 90, this action pivots the ink stick holder 60 so that the ink stick holder platform is rotated out of the lower tube 48 interior. The pivoting of the ink stick holder 60 causes the lever 66 riding thereon to pivot. This action in turn rotates the ink stick stopper 74 so the ink stick stopper tab 78 is urged into the coupling piece bore 58.

The positioning system 42 includes a capture probe 98 mounted to the off wheel ink supply cover 32 and directed towards the print head 24. The capture probe 98 is activated by a solenoid 100 that is controlled by the printer control circuit. The capture probe 98 and capture solenoid 100 are arranged so that when the solenoid 100 is energized, the capture probe 98 is extended towards the print head. When the solenoid 100 is deenergized, deactivated, a biasing spring 94 causes the solenoid 100 to return to its retracted, out-of-the-way position in the off wheel ink supply cover 32.

As depicted in FIG. 3, a top cover 102 is secured over the print head 24. A center opening 104 is formed in the print head top cover 102 provides access to the reservoir openings. At least one positioning notch 106 is formed in the print head top cover. Each positioning notch 106 is positioned so that when the capture probe 98 is engaged therein, at least one reservoir opening 29 is under the delivery assembly lower tube 46 that supplies the correct color of ink sticks to the opening reservoir. In the illustrated embodiment, four delivery assemblies 32 are used to separately supply ink to four different reservoirs 27. Consequently, only one positioning notch 106 is needed to align the print head 24 so that all the reservoir openings 29 are under the correct delivery assemblies 32.

The registration assembly 44 for each delivery assembly 34 includes a registration pin 108 integral with the associated solenoid 90 that extends through an opening 110 formed in the off wheel ink supply cover 32. Each registration pin is arranged coaxially with the associated solenoid rod 92. Each registration pin 108 is attached to the solenoid 90 so that when the solenoid 90 is energized and the solenoid rod 92 is retracted, the registration pin 108 extends below the off wheel ink supply cover 32. As best seen by reference to FIGS. 2 and 3, each registration pin 108 for each ink stick feed delivery assembly 34 has a distinct cross-sectional profile. In the illustrated embodiment each registration pin 108 has a generally cylindrical body with a protuberance 112 extending therefrom. Each protuberance 112 for the separate registration pins 108 is oriented at a different angle relative to the line formed by the center of the off wheel ink supply cover 32 and the center of the registration pin it is attached part of.

Formed in the print head top cover 102 are a number of registration pin openings 114. Each registration pin opening 114 is associated with a specific reservoir opening. When a reservoir opening 29 is in alignment with the delivery system that supplies the proper color ink to the opening's reservoir 27, the associated registration pin opening 114 is under that delivery system's registration pin 108. Each registration pin opening 114 is shaped so that only the specific registration pin 108 that it is designed to be in alignment with can be inserted therein.

The ink stick delivery system 30 is activated whenever a level sensor detects an ink level in one or more of the reservoirs 27 at or approaching the minimum level necessary for proper jetting. In response to monitoring the sensed "low-ink" state, the printer control circuit initially activates the positioning assembly 46 so that ink sticks 31 can be supplied to the appropriate reservoir 27. The print head 24 is first rotated so the appropriate reservoir opening 29 is approximately under the correct lower tube 46. The capture solenoid 100 is then activated extending the capture probe so that it abuts the print head top cover 102. Simultaneously, with the activation of the capture solenoid 100, the print head 24 is slowly rotated until the capture probe 98 latches into the positioning notch 106 so that the appropriate reservoir opening 29 is positioned under the appropriate lower tube 46. In the illustrated embodiment where there are four delivery assemblies 32 supplying ink to four reservoirs 27, the positioning process aligns all the reservoir openings 29 simultaneously.

After the print head 24 is appropriately positioned, the ink stick feed assembly 40 that releases ink sticks 31 for the depleted reservoir 27 is triggered by activating the appropriate solenoid 90. Activation of the solenoid 90 causes the solenoid rod 92 to retract, which in turn pivots the ink stick holder 60 so that it starts to rotate away from the lower tube 48. The rotation of the ink stick holder 60 causes the lever 66 to pivot, which in turn urges the ink stick stopper tab 78 into the coupling piece bore 58. The ink stick stopper tab 78 is urged against the body of the second lowest ink stick 31 in the tube assembly 34. The second lowest ink stick is thus seized between the ink stick stopper tab 78 and the wall of the coupling bore 58 so that it and the ink sticks 31 stacked above it are blocked from moving.

Simultaneously, with seizing of the second lowest ink stick, the ink stick feed assembly 40 is continuously pivoted until the entire ink stick holder 60, including the platform 62, is pivoted out of the lower tube 46. The bottommost ink stick in the lower ink stick tube 46 is thus released to pass through the tube 46 into the reservoir opening 29 below.

After the bottommost ink stick 31 is supplied to the appropriate reservoir 27, the solenoid 90 is deenergized and the ink stick feed assembly returns to its normal inactive state. The ink stick holder 60 pivots back towards the lower tube 46 so that the ink stick holder platform 62 is again disposed inside the lower tube 46. The ink stick stopper 74 is pivoted away from the tube assembly 36 so that the ink stick stopper tab 78 is turned out of the coupling piece bore 58, so that the bottommost ink stick 31, previously the second lowest ink stick, is no longer the seized therein. The bottommost ink stick 31 and, any higher stacked ink sticks 31 fall until the bottommost ink stick's movement is blocked by the ink stick holder platform 62.

Each ink stick feed assembly 40 can be triggered more than once if it is necessary to supply any of the reservoirs with more than one ink stick 31. After the reservoirs 27 have been supplied with the required ink sticks 31, the capture solenoid 100 is deenergized, which causes the capture probe 98 to retract. The print head 24 can then rotate without restriction and is available to resume printing.

Each registration assembly 44 insures that the associated ink stick feed assembly 40 will only trigger successfully when a reservoir opening 29 is aligned under a delivery assembly 34 containing the color of ink sticks 31 the reservoir opening 29 is designed to receive. When the solenoid 90 is energized, the registration pin 108 is projected downward below the off wheel ink supply cover 32. For the solenoid rod 92 to fully retract so that the stick feed assembly 40 can be triggered to release an ink stick 38, the associated registration 108 pin must fully extend into the complementary registration pin opening 114, which should be aligned underneath it.

If the correct reservoir opening 29 is not under a tube assembly 36, a complementary registration pin opening 114 will not be aligned under the associated registration pin 108. Thus, whenever the print head 24 is positioned so that under a selected tube assembly 34, there is either no reservoir opening or a reservoir opening leading to a reservoir that uses a different color ink stick 31 than is stored in the tube assembly 34, the registration pin 108 is blocked from fully extending by the print head top cover 102. Since the registration pin 108 is blocked from extending, the solenoid rod 92 is similarly blocked from retracting. Consequently, triggering of the ink stick feed assembly 40 cannot be completed so that the release of an ink stick 31 thereby is blocked. Thus, the registration assembly 44 prevents a delivery assembly 34 from releasing an ink stick 31 unless a reservoir opening 29 for a reservoir using that color ink is properly in registration with the associated tube assembly 36.

The solid ink delivery system 30 supplies a specific number of ink sticks 31 to be added to the print head reservoirs 27 whenever their ink supply is depleted. This insures that the proper amount of ink is always supplied to the reservoirs 27. Accordingly, the problems associated with the delivery of either excess or insufficient ink to the reservoirs is eliminated.

The biased connection between the lever 66 and the ink stick stopper 74 and the rounded surface of the ink stopper tab 78 prevent the tab 78 from penetrating into the ink stick 31 when urged against it. This insures the ink stick 31 is readily released when the ink stick stopper tab 78 is retracted out of the coupling piece bore, so that the ink stick 31 falls to the lower position. Moreover, this substantially eliminates the possibility of the ink stick stopper tab 78 becoming encrusted with bits of solid ink that would grime the tube assembly 36 and could eventually clog it up.

It is substantially impossible for the ink delivery system 30 to delivery a wrong color ink stick to a reservoir. The registration assemblies 44 prevents the delivery assemblies from releasing an ink stick 31 unless a reservoir opening 29 for an appropriate reservoir 27 is aligned therewith.

The solid ink delivery system 30 uses a form of solid ink, ink sticks 31, that are economical to provide. Also, the ink sticks are in a form that are not unpleasant or difficult for personnel tending the printer 10 to work with. Each of the tube assemblies 36 store a large number of ink sticks 31 so personnel tending the printer 10 do not have to spend a large amount of time repeatedly refilling the solid ink delivery system 30 with ink.

The foregoing description has been limited to a specific embodiment of this invention. It will be apparent, however, that variations and modifications may be made to the invention, with the attainment of some or all of the features of this invention. For instance, in the illustrated embodiment, the print head 24 is cylindrical and rotates, and the delivery assemblies 38 are arranged in an approximately arcuate pattern. In an alternative embodiment of this invention the print head may travel along a substantially linear path and/or the delivery assemblies may be arranged linearly. Alternatively, the print head may be stationary, and the paper or other media printed on set to pass by the ink jets.

The ink sticks and feed assembly can be dimensioned so two or any other number of ink sticks are selectively delivered by the assembly each time it is triggered.

The ink stick delivery system can be used with monochrome printers or multi-color printers. If it is used with multi-color printers the printer may have more than one reservoir or receiving station for each color of ink supplied. For instance, it may be desirble to provide a printer with five reservoirs, and associated ink jet sets; three for the primary colors and two for black. In these embodiments one delivery system could be used to supply the black ink sticks to both reservoirs provided to receive same. These embodiments could thus include multiple positioning notches for aligning the print head, and multiple identical registration pin openings for a single registration pin. Moreover, other registration assemblies may be provided to prevent the ink stick feed assembly from successfully releasing an ink stick unless the appropriate reservoir opening is aligned underneath.

Therefore it is the object and scope of the appended claims to cover all such variations and modifications as come within true spirit of the invention.

What is claimed as new and desired to be secured by a Letter Patent of the United States is:

1. A solid ink delivery system for supplying solid ink sticks to an ink jet printer, the ink jet printer having an opening for receiving the ink sticks, the solid ink delivery system including:

A. a tube means connected to the printer wherein the ink sticks are stacked end-to-end so that there is a bottommost ink stick, said tube means aligned with the reservoir opening;

B. a triggerable ink stick feed assembly connected to said tube means, including:

i. an ink stick holder for selectively restricting the movement of said bottommost ink stick through said tube means; and ii. an ink stick stopper for selectively restricting the movement of the ink sticks stacked a selected distance above said bottommost ink stick in said tube means, and releaseably biased towards the ink sticks in said tube means above the bottommost ink stick;

said ink stick feed assembly having a first, passive, position wherein said ink stick holder restricts the movement of said bottommost ink stick and said ink stick stopper is spaced away from said ink sticks, and a second, triggered, position wherein said ink stick stopper is urged against an ink stick above said bottommost ink stick, without penetrating same, so as to restrict the movement of the stick and all ink sticks stacked thereabove and said ink stick holder releases said bottommost ink stick, so that said bottommost ink stick, and any unrestricted ink sticks stacked thereabove, are released to said printer opening; and C. an actuating means connected to said ink stick feed assembly to trigger same from said passive state to said triggered state.

2. A solid ink delivery system for supplying ink sticks to an ink jet printer, the ink jet printer having at least one opening for receiving the ink sticks, the solid ink delivery system including at least one delivery assembly attached to said printer, said delivery assembly including;

A. a tube means connected to the printer wherein the ink sticks are stacked end-to-end so that there is a bottommost ink stick, said tube means aligned with at least one reservoir opening; and B. a triggerable ink stick feed assembly connected to said tube means, including:

i. an ink stick holder for selectively restricting the movement of said bottommost ink stick through said tube means; and ii. an ink stick stopper for selectively restricting the movement of the ink sticks stacked a selected distance above said bottommost ink stick through said tube means, and releaseably biased towards the ink sticks in said tube means above the bottommost ink stick;

said ink stick feed assembly having a first, passive, position wherein said ink holder restricts the movement of said bottommost ink stick and said ink stick stopper is spaced away from said ink sticks, and a second, triggered, position wherein said ink stick stopper is urged against an ink stick above said bottommost ink stick, without penetrating same, so as to restrict the movement of the stick and all ink sticks stacked thereabove and said ink stick holder releases said bottommost ink stick, so that said bottommost ink stick, and any unrestricted ink sticks stacked thereabove, are released to said printer opening; and C. an actuating means connected to said ink stick feed assembly to individually trigger same from said passive state to said triggered state.

3. The solid ink delivery system of claim 2 wherein the printer includes a moving print head with at least one reservoir for receiving ink, said print head forming the reservoir openings for each said reservoir the ink sticks are introduced thereinto, and the print head positionable so that each of the reservoir openings is selectively alignable to receive ink sticks from at least one of said delivery assemblies.

4. The solid ink delivery system of claim 3 further including:

a registration pin directed toward said print head integral with each said actuating means having a first, retracted position spaced away from said print head, and a second, triggered position extending toward said print head, said registration pin inhibiting the triggering of said associated ink feed stick feed assembly when in said retracted position, said registration pin urged towards said triggered position when said actuating means is actuated;

said print head forming a registration pin opening associated with each of the reservoir openings, each said registration pin opening positioned and dimensioned to receive a triggered state registration pin when the reservoir opening associated therewith is positioned to receive ink sticks from said delivery assembly, said print head dimensioned to otherwise inhibit said registration pin from extending to said triggered position.

5. The solid ink delivery system of claim 4 further including;

said print head formed with at least two reservoirs adapted to receive different kinds of ink;

a plurality of said ink delivery assemblies sufficient for providing different ink required by said print head; said registration pins associated with each said ink delivery assembly having a unique shape for each type of ink supplied;

said print head registration pin openings for each said reservoir opening dimensioned to receive only said registration pin associated with said ink delivery assembly ink to be supplied to said reservoir.

6. The solid ink delivery system of claim 3 further comprising a positioning assembly for aligning the print head so each of said reservoir openings are selectively aligned with a delivery assembly for receiving ink therefrom.

7. The solid ink delivery assembly of claim 3 wherein:

A. the print head includes at least two reservoirs adapted to receive different color ink sticks; and B. a plurality of delivery assemblies, each of said delivery assemblies supplying a different color of ink sticks, and at least one delivery assembly for supplying each color of ink stick required by the print head reservoirs.

8. The solid ink delivery system of claim 7 further including a registration assembly connected to each said delivery assembly ink stick feed assemblies for inhibiting the triggering of said ink stick feed assembly unless a reservoir opening for receiving the color of ink supplied by said delivery assembly is aligned to receive the ink sticks from said delivery assembly tube means.

9. A solid ink delivery system for supplying ink sticks to an ink jet printer, the printer including a moving print head with at least one reservoir for receiving ink, said print head forming a reservoir opening for each reservoir through which the ink sticks are introduced thereinto, the solid ink delivery system including:

A. at least one delivery assembly attached to said printer, said delivery assembly including;

i. a tube means wherein the ink sticks are stacked end-to-end so that there is a bottommost ink stick, said tube means aligned with said printer openings; and ii. a triggerable ink stick feed assembly connected to said tube means having an ink stick holder for selectively restricting the movement of said bottommost ink stick through said tube means and an ink stick stopper for selectively restricting the movement of the ink sticks stacked a selected distance above said bottommost ink stick through said tube means, said ink stick feed assembly having a first, passive, position wherein said ink holder restricts the movement of said bottommost ink stick, and a second, triggered, position wherein said ink stopper restricts the movement of said stacked ink sticks above the bottommost stick and said ink holder releases said bottommost ink stick and any unrestricted ink sticks stacked thereabove are released to said printer opening;

B. positioning means to locate the print head so that each of the reservoir opening is aligned to receive ink sticks from at least one of said delivery assemblies;

C. an actuating means to individually trigger said ink stick feed assemblies from said passive state to said triggered state; and D. a registration assembly connected to each said delivery assembly ink stick feed assemblies for inhibiting the triggering of said ink stick feed assembly unless a reservoir opening for receiving the color of ink supplied by said delivery assembly is aligned to receive the ink sticks from said delivery assembly tube means.

10. The solid ink delivery system of claim 9 wherein said registration assembly includes:

a registration pin directed toward said print head integral with each said actuating means having a first, retracted position spaced away from said print head, and a second, triggered position extending toward said print head, said registration pin inhibiting the triggering of said associated ink feed stick feed assembly when in said retracted position, said registration pin urged towards said triggered position when said actuating means is actuated;

said print head forming a registration pin opening associated with reservoir opening, each said registration pin opening located positioned and dimensioned to receive a triggered state registration pin when the reservoir opening associated therewith is positioned to receive ink sticks from said delivery assembly, said print head dimensioned to otherwise inhibit said registration from extending to said triggered position.

11. The solid ink delivery system of claim 10 further including:

said print head formed with at least two reservoirs adapted to receive different kinds of ink;

a plurality of said ink delivery assemblies sufficient for providing different ink required by said print head; said registration pins associated with each said ink delivery assembly having a unique shape for each type of ink supplied;

said print head registration pin openings for each said reservoir opening dimensioned to receive only said registration pin associated with said ink delivery assembly ink to be supplied to said reservoir.

* * * * *